United States Patent
Lee

(10) Patent No.: US 11,115,563 B2
(45) Date of Patent: Sep. 7, 2021

(54) METHOD AND APPARATUS FOR NONLINEAR INTERPOLATION COLOR CONVERSION USING LOOK UP TABLES

(71) Applicant: ATI Technologies ULC, Markham (CA)

(72) Inventor: Keith Lee, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/022,999

(22) Filed: Jun. 29, 2018

(65) Prior Publication Data

US 2020/0007718 A1    Jan. 2, 2020

(51) Int. Cl.
| | |
|---|---|
| *G06T 3/40* | (2006.01) |
| *H04N 1/60* | (2006.01) |
| *H04N 5/235* | (2006.01) |
| *G06T 1/20* | (2006.01) |
| *H04N 19/80* | (2014.01) |

(52) U.S. Cl.
CPC .............. *H04N 1/6019* (2013.01); *G06T 1/20* (2013.01); *G06T 3/4007* (2013.01); *H04N 5/2355* (2013.01); *H04N 19/80* (2014.11)

(58) Field of Classification Search
CPC .... H04N 1/6019; H04N 19/80; H04N 5/2355; G06T 1/20; G06T 3/4007
See application file for complete search history.

(56) References Cited

U.S. PATENT DOCUMENTS

| | | | | |
|---|---|---|---|---|
| 5,809,213 A | * | 9/1998 | Bhattacharjya | ...... H04N 1/6033 358/1.6 |
| 7,177,465 B1 | | 2/2007 | Takahira | |
| 2006/0119870 A1 | | 6/2006 | Ho | |
| 2007/0080974 A1 | * | 4/2007 | Edge | ...... H04N 1/407 345/589 |
| 2009/0154803 A1 | | 6/2009 | Mizukura | |
| 2013/0050245 A1 | | 2/2013 | Longhurst | |
| 2013/0222408 A1 | * | 8/2013 | Lee | ...... G09G 5/02 345/589 |
| 2014/0118387 A1 | * | 5/2014 | Kim | ...... H04N 9/67 345/590 |
| 2014/0002480 A1 | | 10/2014 | Bhaskaran | |
| 2015/0243200 A1 | * | 8/2015 | Pan | ...... H04N 19/186 345/590 |

(Continued)

OTHER PUBLICATIONS

Han, Dongil; Real-Time Color Gamut Mapping Method for Digital TV Display Quality Enhancement; IEEE; Feb. 29, 2004.

(Continued)

*Primary Examiner* — Syed Haider
(74) *Attorney, Agent, or Firm* — Faegre Drinker Biddle & Reath LLP

(57) ABSTRACT

A method and apparatus obtains a source image having a plurality of source color gamut pixels in a source color gamut. The method and apparatus converts the plurality of source color gamut pixels to a plurality of corresponding target color gamut pixels using non-linear interpolation of a plurality of output pixel values from a reduced 3-D look-up table (LUT) for a target color gamut. The method and apparatus provides, for display, the plurality of target color gamut pixels (e.g., one or more pixels) on a target color gamut display.

20 Claims, 9 Drawing Sheets

(56) References Cited

U.S. PATENT DOCUMENTS

| | | | |
|---|---|---|---|
| 2015/0248747 A1* | 9/2015 | Atkins | G06T 5/10 |
| | | | 345/589 |
| 2016/0379595 A1 | 12/2016 | Stauder et al. | |
| 2017/0041507 A1* | 2/2017 | Chen | G06T 5/002 |
| 2018/0350322 A1* | 12/2018 | Marcu | G09G 5/06 |

OTHER PUBLICATIONS

Lee, Hak-Sung et al.; A Real Time Color Gamut Mapping Using Tetrahedral Interpolation for Digital TV Color Reproduction Enhancement; IEEE; Oct. 25, 2008.

Sikudova, Elena et al.; A Gamut Mapping Framework for Color-Accurate Reproduction of HDR Images; Nov. 24, 2017.

Kang; Henry R.; Chapter 9 Three-Dimensional Lookup Table with Interpolation; May 17, 2006.

Wowow Entertainment; What is LUT?; 2016.

Wikipedia; Linear Interpolation; Mar. 9, 2018.

Ljubuncic; Goran; Using Luts? Here is What You Need to Know; from lutify.me; Aug. 2016.

What is a LUT?; from lightillusion.com; Jul. 2018.

Wikipedia; Rec. 2020; Jun. 21, 2018.

Wikipedia; Rec. 709; Jul. 17, 2018.

Wikipedia; ICtCp; Jun. 5, 2018.

International Telecommunication Union; High dynamic range television for production and international programme exchange; Report ITU-R BT.2390-3; Oct. 2017.

U.S. Patent and Trademark Office; Final Rejection; U.S. Appl. No. 15/961,037; dated Feb. 18, 2020.

U.S. Patent and Trademark Office; Non-Final Rejection; U.S. Appl. No. 15/961,037; dated Sep. 18, 2019.

U.S. Patent and Trademark Office; Non-Final Rejection; U.S. Appl. No. 15/961,037; dated Oct. 1, 2020.

\* cited by examiner

RGB Color Space for Color Gamut

Vertices of a Sub-Cube

METHOD AND APPARATUS FOR NONLINEAR INTERPOLATION COLOR CONVERSION USING LOOK UP TABLES

BACKGROUND OF THE DISCLOSURE

Recent improvements in monitors, television screens, and/or other display screens allow users to view movies and/or images in higher definition settings. For example, whereas some monitors and/or other display screens may only be able to show movies and images in a standard dynamic range (SDR), other monitors and/or other display screens may show movies and images in a high dynamic range (HDR) or a wide color gamut (WCG). However, higher definition settings, such as settings with high luminance levels and/or very wide color gamuts (e.g., HDR or WCG), may require additional resources and/or processing to display on a device with a limited luminance range and/or narrower color gamut. For instance, HDR movies and images may have a dynamic luminance range of 0 to 10,000 nits. However, SDR displays may only have a dynamic luminance of 0.1 to 100 nits. Thus, some monitors and/or other display screens might not have the capability to display HDR movies and/or images while maintaining reasonable picture quality.

Image processors, such as graphics processing units (GPUs), central processing units (CPUs), application-specific integrated circuits (ASICs), and other processors, may use look-up tables (LUTs) to allow HDR movies and/or images to be shown on SDR display screens. For instance, an HDR display screen may be able to display a color gamut that includes one hundred different shades of red, but an SDR display screen may be able to display a color gamut that includes only sixty of the hundred shades of red. Thus, graphics processing units may use LUTs to map each of the hundred different shades of red to one of the sixty shades of red. However, as color gamuts get more complex, the LUTs required to process them require greater amounts of memory and further, the colors might not be linearly mapped (e.g., four shades of red may be mapped to one shade of red and seven shades of red may be mapped to another shade of red). Accordingly, there exists a need for one or more improved methods and/or apparatus in order to address one or more of the above-noted drawbacks.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF EMBODIMENTS

Figure 1:
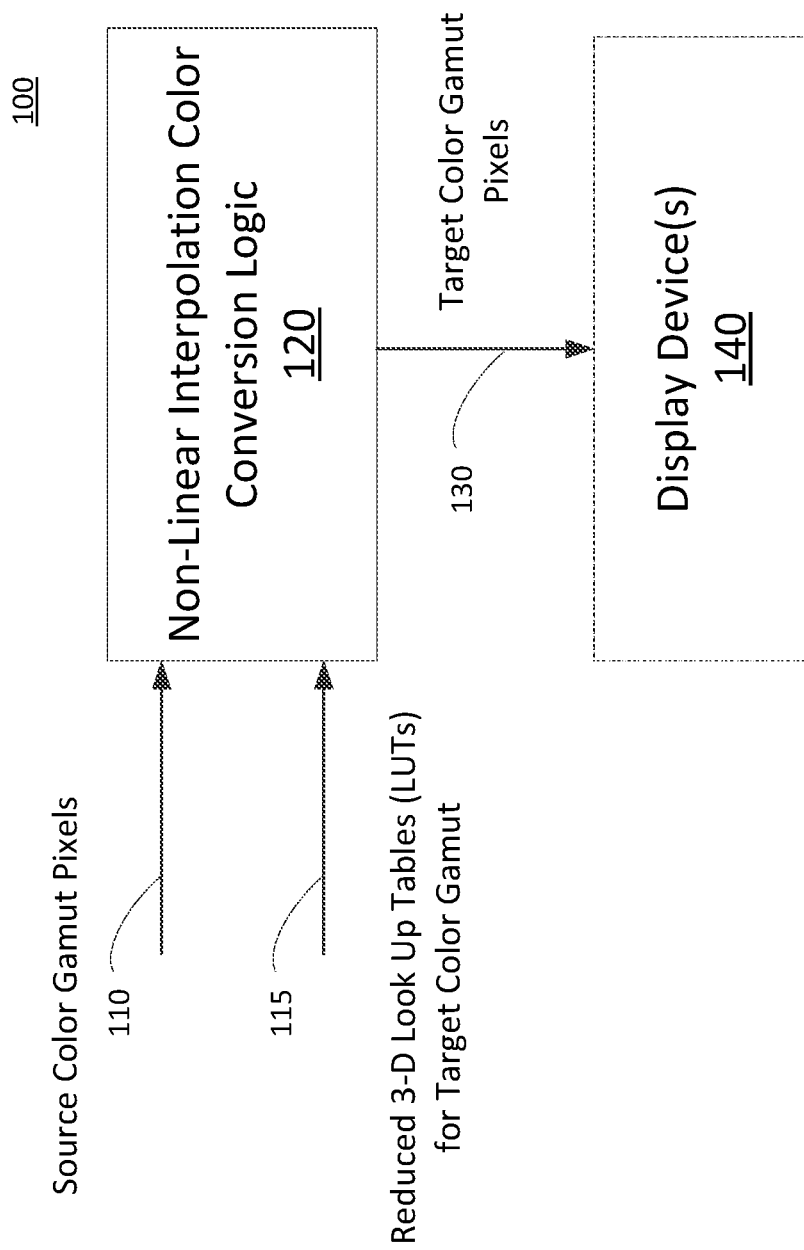
FIG. 1 is a schematic block diagram illustrating an apparatus for mapping between color gamuts in accordance with one embodiment set forth in the disclosure.

Briefly, in some examples, an apparatus provides a method for converting between color gamuts using interpolation of a plurality of pixel values from a reduced 3-D look-up table (LUT). Additionally, the apparatus provides a method to minimize the interpolation error using the reduced 3-D LUT. Gamut mapping describes mapping or converting pixels from one color gamut, such as a source (e.g., High Dynamic Range [HDR] or wide color gamut [WCG]) color gamut, to another color gamut that is more limited, such as a target (e.g., Standard Dynamic Range [SDR]) color gamut.

In some implementations, the method and apparatus obtains a source image, such as a video frame, movie frame, or an image. The source image is in a color gamut that cannot be entirely displayed by a display device due to a difference in color gamuts between the source image and the displayable color gamut of the display system. For example, the source image is in a HDR color gamut whereas the display device can only display SDR color gamuts. The method and apparatus obtains a reduced 3-D LUT for a color gamut, such as a target color gamut. The method and apparatus converts source color gamut pixels from the source image to target color gamut pixels that are able to be displayed on the target display device using the reduced 3-D LUT for the target color gamut while maintaining good picture quality. For example, the method and apparatus determines a sub-cube representing entries (e.g., vertices, displayable pixel values, or displayable target color values) within the reduced 3-D LUT. The method and apparatus determines a set of coefficients for the sub-cube, and uses the set of coefficients to transform the source color gamut pixels. The method and apparatus performs interpolation (e.g., tetrahedral, tri-linear, or non-linear) on the transformed pixel values to convert them to target color gamut pixels.

In some examples, the method and apparatus obtains a source image having a plurality of source color gamut pixels in a source color gamut. The method and apparatus converts the plurality of source color gamut pixels to a plurality of corresponding target color gamut pixels using non-linear interpolation of a plurality of output pixel values from a reduced 3-D look-up table (LUT) for a target color gamut. The method and apparatus provides, for display, the plurality of target color gamut pixels (e.g., one or more pixels) on a target color gamut display.

In some implementations, the method and apparatus performs a non-linear interpolation for a plurality of first pixel values from the reduced 3-D LUT that is different from a second non-linear interpolation for a plurality of second pixel values from the reduced 3-D LUT. The plurality of first pixel values from the reduced 3-D LUT represent vertices of a sub-cube within the target color gamut. The plurality of second pixel values from the reduced 3-D LUT represent vertices of a different sub-cube within the target color gamut. The method and apparatus determines a set of polynomial coefficients for the sub-cube based on the first plurality of source color gamut pixel values. The method and apparatus performs the first non-linear interpolation based on the set of polynomial coefficients.

In some implementations, prior to a tetrahedral interpolation calculation or a tri-linear interpolation calculation, the method and apparatus converts pixel values of the pixel, from the plurality of source color gamut pixels, to transformed pixel values based on the set of polynomial coefficients for the selected sub-cube.

In some implementations, a graphics driver calculates the set of polynomial coefficients by performing a Taylor Series transform based on the non-linear interpolation of the vertices of the sub-cube within the target color gamut. In some implementations, the first non-linear interpolation is a piecewise linear curve or a polynomial equation.

In some examples, the method and apparatus converts the plurality of source color gamut pixels to the plurality of corresponding target color gamut pixels using a 3-D engine. In some examples, the method and apparatus converts the plurality of source color gamut pixels to the plurality of corresponding target color gamut pixels using a video encoder before encoding video in target color gamut. The video encoder obtains the plurality of source color gamut pixels from a server via an internet connection. In some implementations, the method and apparatus converts the plurality of source color gamut pixels to the plurality of corresponding target color gamut pixels using a display engine. The display engine performs tone mapping operations for the target color gamut display.

FIG. 1 illustrates one example of an apparatus 100, such as an image processing device, for non-linear interpolation color conversion logic. In some implementations, the apparatus 100 includes any type of computing device suitable for implementing aspects of embodiments of the disclosed subject matter. Examples of computing devices include but are not limited to "workstations," "servers," "cloud computing platforms", "laptops," "desktops," "tablet computers," "hand-held devices," "game consoles," "general-purpose graphics processing units (GPGPUs)," "APUs," "CPUs," "GPUs," "state machines," printers, integrated circuits and the like, all of which are contemplated within the scope of FIG. 1, with reference to various components of the apparatus 100.

Figure 2:
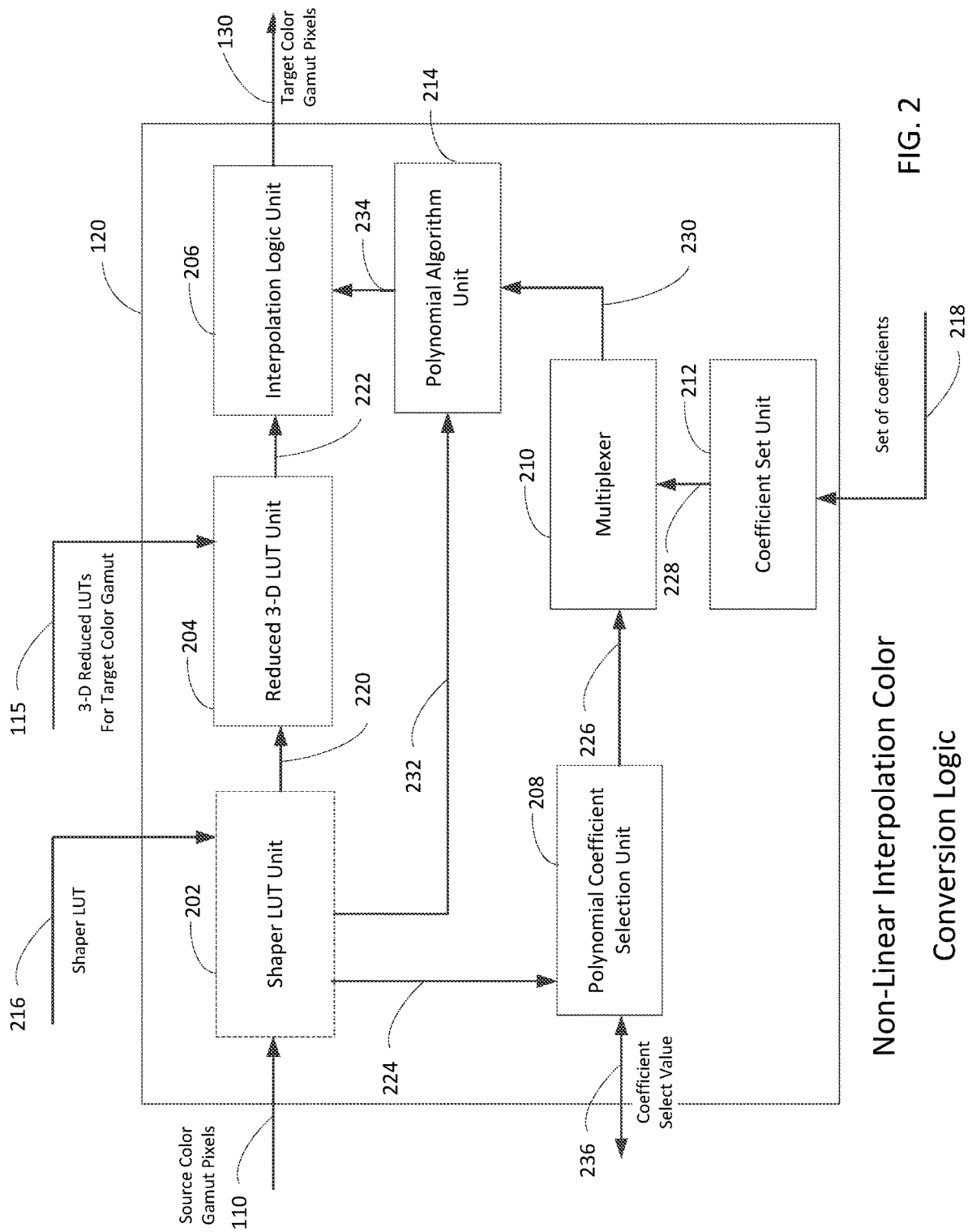
FIG. 2 is a schematic block diagram illustrating an example of a non-linear interpolation color conversion logic for mapping between different color gamuts in accordance with one embodiment set forth in the disclosure.

In some examples, the apparatus 100 includes non-linear interpolation color conversion logic 120 and display device(s) 140. The non-linear interpolation color conversion logic 120 obtains source color gamut pixels 110 and reduced 3-D look up tables (LUTs) for a target color gamut. FIG. 2 illustrates an example of the non-linear interpolation color conversion logic 120.

Referring to FIG. 2, the non-linear interpolation color conversion logic 120 includes a shaper LUT unit 202, a reduced 3-D LUT unit 204, interpolation logic unit 206, polynomial coefficient selection unit 208, a multiplexer 210, a coefficient set unit 212, and a polynomial algorithm unit 214. Although these sub-units 202, 204, 206, 208, 210, 212, and 214 are illustrated as children units subordinate of the parent unit, each sub-unit can be operated as a separate unit from the non-linear interpolation color conversion logic 120, and other suitable combinations of sub-units are contemplated to suit different applications. The non-linear interpolation color conversion logic 120 is any suitable logic configuration including, but not limited to, one or more state machines, one or more digital signal processors, GPUs, APUs or processors that execute kernels, and/or other suitable structure as desired. Further, as described in further detail below in FIG. 3, the non-linear interpolation color conversion logic 120 converts the source color gamut pixels 110 to corresponding target color gamut pixels 130.

In some variations, the apparatus 100 optionally includes display device(s) 140. When present, the non-linear interpolation color conversion logic 120 and the display device(s) 140 are in the same apparatus. The display device 140 includes one or more monitors, television screens, projection device, and/or other display screens that display and/or show video frames, movies, and/or images. The display device 140 obtains, from the non-linear interpolation color conversion logic 120, pixels (e.g., target color gamut pixels 130) and/or displays the target color gamut pixels 130. However, some apparatuses 100, such as cloud computing platforms, servers, and/or integrated circuits, may not include a display device. In such apparatuses, the non-linear interpolation color conversion logic 120 uses the reduced 3-D LUTs for the target color gamut of the display device to convert from source color gamut pixels 110 to target color gamut pixels 130. After converting the pixels from the source to target color gamut, the non-linear interpolation color conversion logic 120 transmits and/or sends image data via the internet, wirelessly via wired buses, or through any suitable manner to one or more additional apparatuses that house the display device(s) 140.

The illustrative apparatus 100, including the non-linear interpolation color conversion logic 120, shown in FIGS. 1 and 2, are not intended to suggest any limitation as to the scope of use or functionality of embodiments of the present disclosure. Neither should the illustrative apparatus 100 or the non-linear interpolation color conversion logic 120 be interpreted as having any dependency or requirement related to any single component or combination of components illustrated therein. Additionally, various components depicted in FIGS. 1 and 2 are, in embodiments, integrated with various ones of the other components depicted therein (and/or components not illustrated), all of which are considered to be within the ambit of the present disclosure.

Figure 3:
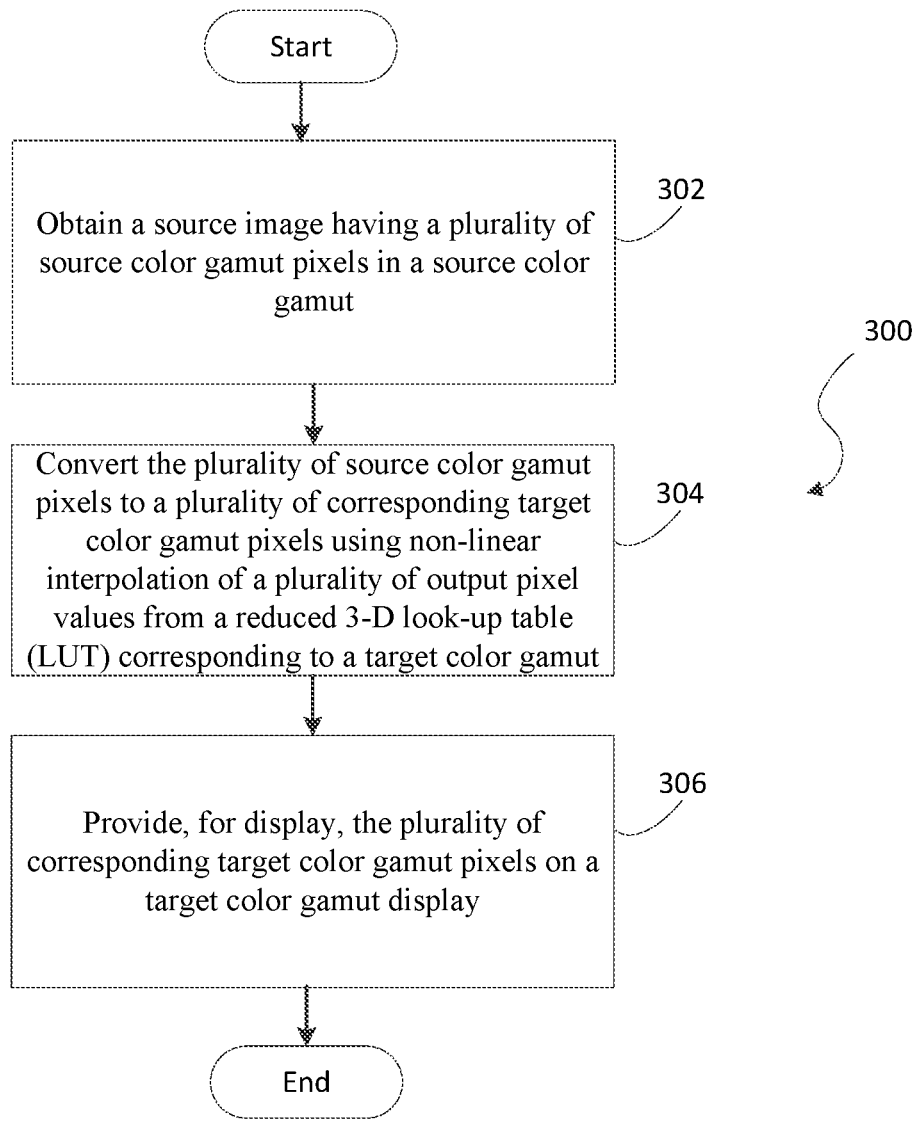
FIG. 3 is a flowchart illustrating a method for mapping between color gamuts in accordance with one embodiment set forth in the disclosure.

FIG. 3 illustrates one example of a method for non-linear interpolation color conversion. FIG. 3 is described below in reference to the apparatus 100 illustrated in FIG. 1 and the non-linear interpolation color conversion logic 120 illustrated in FIG. 3. However, any suitable structure can be employed. For example, solely for the sake of brevity, the non-linear interpolation color conversion logic 120 illustrated in FIG. 2 is described with reference to the method in FIG. 3. However, in some implementations of the method described in FIG. 3, the non-linear interpolation color conversion logic 120 includes additional units than those illustrated in FIG. 2. Further, in other implementations of the method, one or more sub-units 202, 204, 206, 208, 210, 212, or 214 are missing from the non-linear interpolation color conversion logic 120.

In operation, at step 302, the non-linear interpolation color conversion logic 120 obtains (e.g., receives and/or retrieves) a source image having a plurality of source color gamut pixels 110 in a source color gamut. In some variations, obtaining the source image includes, but is not limited to receiving the source frame(s) from a source image provider and/or retrieving the source image from one or more frame buffers in memory, a server, and/or other source. The source image is from a video (e.g., a video frame), video and/or computer game, and/or another suitable image.

In some implementations, the source image is composed of pixels, such as source color gamut pixels 110. The source color gamut pixels 110 are encoded for a source color gamut, such as an HDR or WCG color gamut (e.g., a BT.2020 color gamut, BT.2100 color gamut, DCI-P3 color gamut, P3 color gamut). For example, in some variations, the source color gamut includes one hundred different shades of red. However, the display device 140 has a target (e.g., more limited) color gamut, such as SDR color gamut (e.g., Rec.709 color gamut, Adobe RGB 1998 color gamut, BT 709 color gamut, sRGB color gamut, or additional color gamuts that are smaller and/or narrower than the BT. 709 color gamut). For instance, the target color gamut includes sixty shades of red. Due to the limited color gamut display capabilities, the display device 140 is not able to reproduce and display or show the source color gamut pixels 110 in the HDR color gamut (e.g., all one hundred shades of red).

At step 304, the non-linear interpolation color conversion logic 120 converts the plurality of source color gamut pixels 110 to a plurality of corresponding target color gamut pixels 130 using non-linear interpolation of a plurality of output pixel values from a reduced 3-D look-up table (LUT) corresponding to a target color gamut. In some variations, converting the plurality of source color gamut pixels 110 to a plurality of target color gamut pixels 130 includes, but is not limited to, transforming and/or mapping the plurality of source color gamut pixels 110 to a plurality of target color gamut pixels 130. Step 304 can be performed using many different implementations. FIG. 3 describes one such implementation of step 304.

In some implementations, the shaper LUT unit 202 is optional. Instead, the polynomial coefficient selection unit 208, the polynomial algorithm unit 214, and/or the reduced 3-D LUT unit 204 can obtain the source color gamut pixels 110 directly via an internet connection and/or from memory 440.

The operation of the non-linear interpolation color conversion logic 120 will be described initially without the shaper LUT unit 202. In operation, the reduced 3-D LUT unit 204 obtains data 220, such as the source color gamut pixels 110. Further, the reduced 3-D LUT unit 204 obtains LUTs, such as reduced 3-D LUTs 115 for the target color gamut. In some variations, LUTs include entries for pixel values. For example, each entry corresponds to a RGB pixel value for a color gamut, such as a target color gamut. In other words, each entry is a displayable target color value for the display device 140. In some embodiments, the entries within a reduced 3-D LUT are not displayable target colors for the display device 140. Instead, the entries of the reduced LUT are in another color format, such as the best color format to reduce the interpolation error. Then, the output is then further converted to other color formats using another reduced 3-D LUT and/or another method. After the second, third, or subsequent conversions, the display device 140 is able to display the result.

The reduced 3-D LUT 115 includes less than all the entries within the color gamut. For instance, an example color gamut, such as the target or source color gamut, can include numerous different colors. In a 3-dimensional (3-D) color space (e.g., red, green, blue color space) with each RGB value being 8 bits long, for example, the color gamut can represent $2^{24}$ or 16,777,216 different colors. An N-dimensional color space (e.g., red, green, blue, and/or other colors in a color space) can include even more dimensions (e.g., N>3). A 1 to 1 mapping of source to target color gamuts in just the 3-D space (e.g., a 1 to 1 conversion ratio from source to target color gamuts) includes 16,777,216 different entries. To conserve memory, the reduced 3-D LUT 115 includes less than 16,777,216 different entries.

In some examples, such as the examples described in FIGS. 6 and 7 below, the reduced 3-D LUT 115 includes 3 values for red, 3 values for green, and 3 values for blue for a total of 27 entries. In some variations, the reduced 3-D LUT can include any number of entries, including more or less than 27 entries. For example, the reduced 3-D LUT can include 17 values for red, green, and blue for a total of 4096 entries. Additionally, and/or alternatively, in some implementations, the reduced 3-D LUT might not be in 3-D, but rather an LUT that includes N-dimensions (N-D). Additionally and/or alternatively, in some implementations, the reduced LUT (e.g., 3-D or N-D) includes RGB values that are M number of bits long (e.g., 8, 10, 12, or 14 bits). All different variations of the reduced 3-D LUT 115, including any number of entries within the reduced 3-D LUT 115, are included within the method described within.

Figure 6:
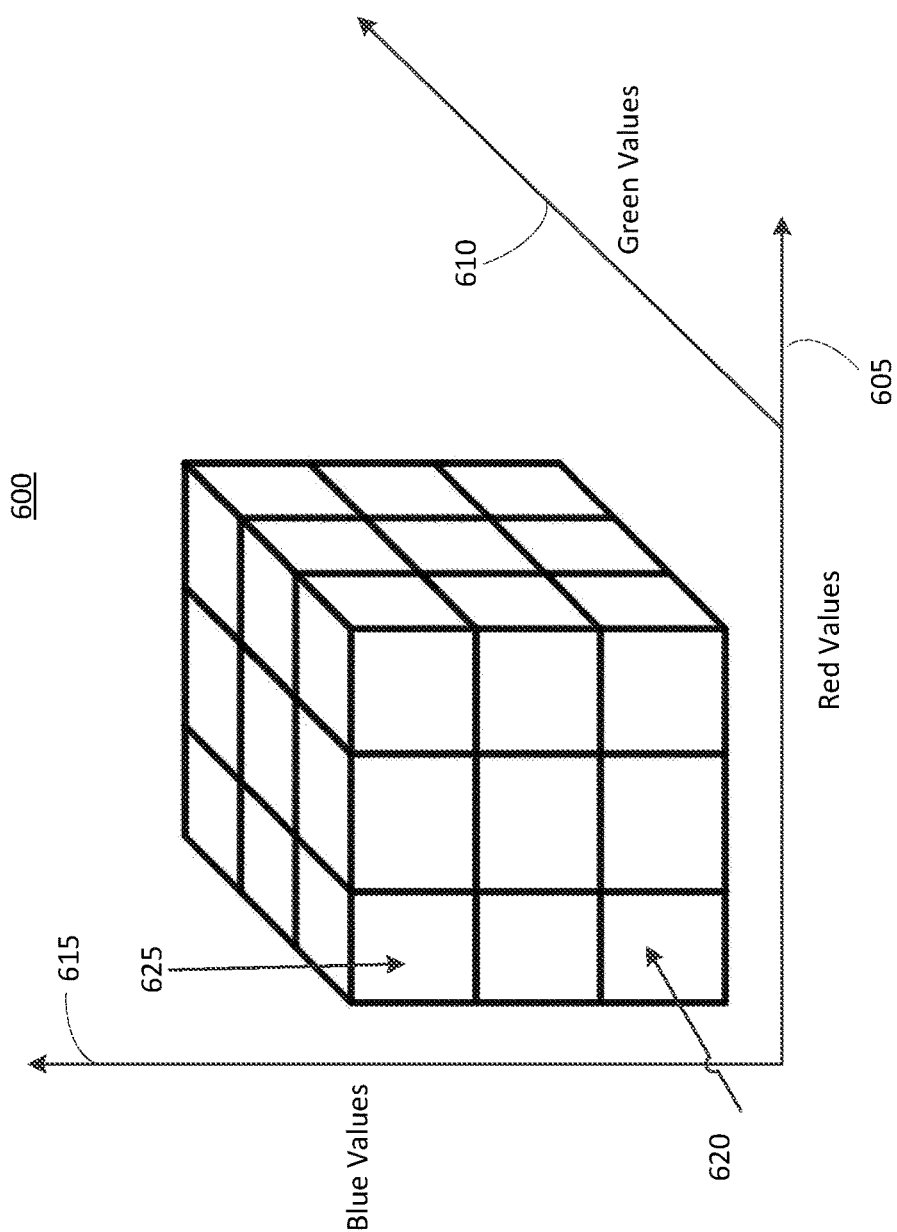
FIG. 6 is an exemplary pictorial representation of a red green blue (RGB) color space for a color gamut in accordance with one embodiment set forth in the disclosure.

FIG. 6 shows a graphical example of an RGB color space for a color gamut (e.g., the target color gamut). For example, the reduced 3-D LUT 115 includes RGB color value entries and by mapping the entries into xyz coordinates (e.g., x axis represents red values 605; the z axis represents green values 610; and the y axis represents blue values 615), an example RGB color space is illustrated. For instance, the color space for the target color gamut is encompassed and/or represented by a cube 600. The cube 600 also includes polygons or sub-cubes, such as sub-cubes 620 and 625. The entries of the reduced 3-D LUTs 115 are vertices (e.g., pixel values) of the plurality of sub-cubes. In some implementations, cubes (e.g., cube 600) and/or sub-cubes (e.g., sub-cube 620 and 625) have sides that are not equal to each other. For example, a side from sub-cube 620 is not equal to another side from sub-cube 620. Additionally, and/or alternatively, the cubes and/or sub-cubes can have more or less than 6 faces. Thus, the cube 600 and/or sub-cubes can any suitable volume, including but not limited to hexahedrons, cylinders, spheres, and/or other 2-D and/or 3-D polygons. While FIG. 6 shows the RGB color space, in some implementations, the non-linear interpolation can be applied to other color spaces, such as YCbCr or ICrCp.

Figure 7:
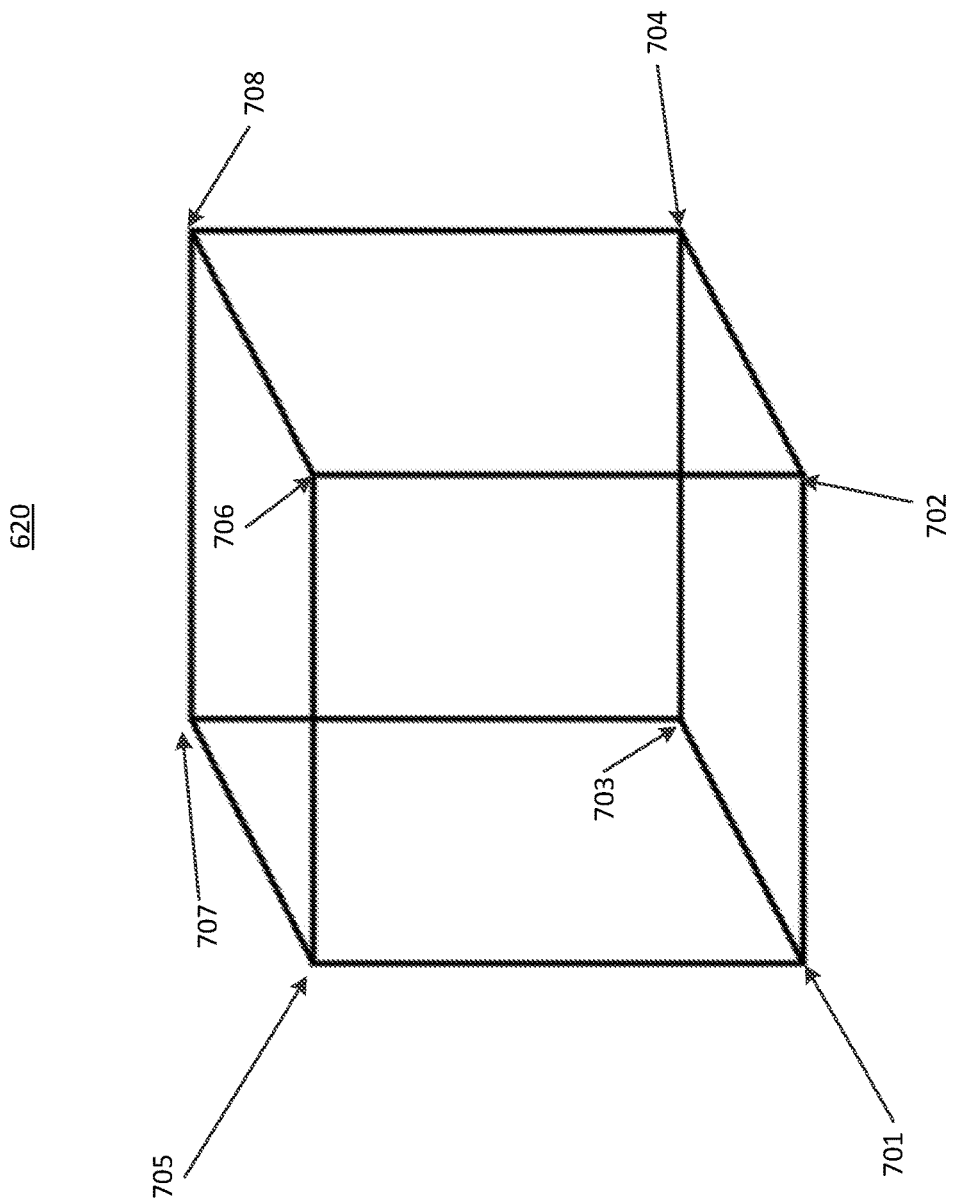
FIG. 7 is an exemplary pictorial representation of vertices of a sub-cube in accordance with one embodiment set forth in the disclosure.

FIG. 7 shows a graphical example of the vertices of one sub-cube, such as sub-cube 620. Referring to FIG. 7, each of the vertices, denoted by points 701-708, are entries within the reduced 3-D LUT 115. For instance, point 701 represents the first entry in the reduced 3-D LUT 115, point 702 represents the second entry, and so on.

After obtaining the source color gamut pixels 110, the reduced 3-D LUT unit 204 identifies, on a pixel-by-pixel basis, a sub-cube for a pixel from the source color gamut pixels 110. For example, referring to FIG. 7, the reduced 3-D LUT unit 204 identifies sub-cube 620 within cube 600 if the RGB pixel values are within the RGB values of the vertices. In other words, the reduced 3-D LUT unit 204 identifies the sub-cube as the sub-cube with vertices (e.g., RGB values from the reduced 3-D LUT 115) surrounding the pixel (e.g., the pixel value).

In some implementations, the sub-cube (e.g., sub-cube 620) is able to be identified based on the most significant bits from the pixel value for the pixel. For instance, if each RGB value has 14 bits, then the four most significant bits (e.g., the four largest bits for each of the RGB values) are used to determine the sub-cube. Thus, in such implementations, data 220 can include the four largest bits of the RGB values.

After determining the sub-cube (e.g., sub-cube 620), the reduced 3-D LUT unit 204 transmits data 222, such as the 3D LUT content corresponding to vertices of the sub-cube, to the interpolation logic unit 206. The interpolation logic unit 206 uses the data 222 to convert the pixel from the plurality of source color gamut pixels 110 to a corresponding pixel of the target color gamut pixels 130. For example, the interpolation logic unit 206 performs a tri-linear interpolation or a tetrahedral interpolation using the vertices of the sub-cube to convert the pixel from the source color gamut pixels 110 to the target color gamut pixels 130.

As known in the art, previous systems have incorporated the shaper LUT unit 202, the reduced 3-D LUT unit 204, and the interpolation logic 206 that uses tri-linear or tetrahedral interpolation. For example, in previous systems, the interpolation logic unit 206 causes conversion errors when converting from source to target color gamut using pixel values for the source color gamut pixels 110. This is due to the conversions being non-linear conversions or transformations (e.g., $f(x)=x^{2.4}$ where $f(x)$ is denotes the pixel value in the target color gamut and x denotes the pixel value in the source color gamut). In other words, converting a pixel value from the source color gamut to the target color gamut requires a non-linear transform, equation, and/or conversion. However, tri-linear and/or tetrahedral interpolation uses only linear equations to convert the pixel values from source to target color gamuts.

In previous systems, to account for some of the non-linearity between the color gamuts, a shaper LUT unit 202 is used. For example, the shaper LUT unit 202 obtains source color gamut pixels 110. As mentioned previously, each of the pixels 110 contains pixel values (e.g., red, green, blue values). The shaper LUT unit 202 converts the pixel color values to a new set of pixel values. For instance, the shaper LUT unit 202 performs a non-linear transform function on the pixel values of the source color gamut pixels 110 to generate a new set of pixel values. Afterwards, the shaper LUT unit 202 transmits the new set of pixel values to the reduced 3-D LUT unit 204 and the polynomial coefficient selection unit 208. Thus, the shaper LUT unit 202 transmits the new set of pixel values (e.g., the input pixel values) to the reduced 3-D LUT unit 204. The shaper LUT unit 202 does not perform non-linear interpolation of the output values (e.g., output pixel values) from the reduced 3-D LUT unit 204. Additionally, and/or alternatively, the shaper LUT unit 202 obtains a shaper LUT 216. The shaper LUT is a look up table that transforms the pixel values of the source color gamut pixels 110 to the new set of pixel values.

However, even using the shaper LUT unit 202 can cause interpolation errors when converting from source to target color gamuts. In some examples, non-linearity between different sub-cubes (e.g., sub-cubes 620 and 625) within a color gamut (e.g., cube 600) are different. For example, some sub-cubes are linear and/or almost linear (e.g., the center sub-cubes of cube 600), other sub-cubes are slightly non-linear, and even other sub-cubes are significantly non-linear (e.g., the surface sub-cubes, such as sub-cube 620).

Therefore, rather than the interpolation logic unit 206 using RGB values from the shaper LUT unit 202 and/or the reduced 3-D LUT unit 204, which was used in previous systems, the interpolation logic unit 206 obtains and/or uses data 234, such as RGB values, from the polynomial algorithm unit 214. In other words, the non-linear interpolation color conversion logic 120 uses the non-linearity within a sub-cube (e.g., sub-cube 620) to convert from the plurality of source color gamut pixels 110 to the plurality of target color gamut pixels 130. This is described in further detail below within reference to the polynomial coefficient selection unit 208, the multiplexer 210, the coefficient set unit 212, and the polynomial algorithm unit 214.

For example, the polynomial coefficient selection unit 208 obtains data 224, such as the source color gamut pixels 110, from the shaper LUT unit 202. Similar to the reduced 3-D LUT unit 204, the polynomial coefficient selection unit 208 identifies, on a pixel-by-pixel basis, a sub-cube for a pixel from the source color gamut pixels 110. For example, referring to FIG. 7, the polynomial coefficient selection unit 208 identifies sub-cube 620 within cube 600 if the RGB pixel values are within the RGB values of the vertices (e.g., between [0,0,0] and [0.5333,0.5333,0.5333]). In other words, the polynomial coefficient selection unit 208 identifies the sub-cube as the sub-cube with vertices (e.g., RGB values from the reduced 3-D LUT 115) surrounding the pixel (e.g., the pixel value). In some implementations, the sub-cube (e.g., sub-cube 620) is able to be identified based on the most significant bits for the pixel. For instance, if each RGB value has 14 bits, then the four most significant bits (e.g., the four largest bits for each of the RGB values) are used to determine the sub-cube. Thus, in such implementations, data 224 includes the four most significant bits of the pixel.

After identifying the sub-cube for the pixel from the source color gamut pixels 110, the polynomial coefficient selection unit 208 obtains, from memory (e.g., read only memory [ROM] or read access memory [RAM]), a coefficient select value 236. For example, each sub-cube within cube 600 is stored as a different coefficient select value. In some implementations, sub-cube 620 has a coefficient select value of 1, and sub-cube 625 has a coefficient select value of 2. Each of the 8 sub-cubes in FIG. 6 has a different coefficient select value. As mentioned above, in some variations, if a cube has 4096 sub-cubes, then the polynomial coefficient selection unit 208 obtains a coefficient select value from 1 to 4096.

After obtaining the coefficient select value, the polynomial coefficient selection unit 208 transmits data 226, such as the coefficient select value, to the multiplexer 210. Additionally, the multiplexer 210 also obtains data 228, such as a plurality of coefficient sets, from the coefficient set unit 212. Each coefficient select value is for a corresponding sub-cube from cube 600, and depending on the sub-cube, the multiplexer 210 selects a set of coefficients. For example, the coefficient select value 226 is the control signal, the multiplexer 210 selects a set of coefficients from the plurality of coefficient sets 228.

The coefficient set unit 212 obtains, stores, and/or calculates a coefficient set for one or more sub-cubes. For example, in some implementations, the coefficient set unit 212 obtains, stores, and/or calculates a different coefficient set for each sub-cube (e.g., sub-cubes 1-8 shown in FIG. 6). In other implementations, the coefficient set unit 212 obtains, stores, and/or calculates a same coefficient set for one or more sub-cubes (e.g., for sub-cube 620 and 625).

The coefficient set unit 212 calculates the coefficient sets based on the nonlinearity of the red, green, and blue color mapping values for a corresponding sub-cube. For example, the coefficient set unit 212 calculates a coefficient set based on the RGB values within the sub-cube. In some variations, the coefficient set unit 212 calculates a Taylor Series polynomial from the non-linearity of the sub-cube (e.g., sub-cube 620). The coefficients of the Taylor Series are the set of coefficients for the sub-cube (e.g., sub-cube 620). In some embodiments, the coefficient set unit 212 calculates the set of coefficients for the sub-cube using a piece-wise linear function of a 1D LUT.

In some implementations, the coefficient set unit 212 calculates a different coefficient set for each sub-cube. In other implementations, such as implementations with similar linearity between sub-cubes, the coefficient set unit 212 calculates a single set of coefficients for a set of sub-cubes with similar linearity. By doing so, the design costs are minimized. Further, in even other implementations, the coefficient set unit 212 calculates a linear coefficient set for a sub-cube (e.g., center sub-cubes with linear properties).

In some variations, the coefficient set unit 212 obtains and/or stores the coefficient set for the one or more sub-cubes. In such variations, the apparatus 100 includes a graphics driver. The graphics driver is within a processor, such as a central processing unit (CPU) or an accelerated processing unit (APU). The graphics driver calculates the set of coefficients for the one or more sub-cubes and then transmits the set of coefficients 218 to the coefficient set unit 212. The coefficient set unit 212 then stores the set of coefficients 218. In some instances, the graphics driver may calculate the set of coefficients prior to the coefficient set unit 212 using the set of coefficients.

As mentioned above, depending on the coefficient selection value (e.g., the sub-cube for the pixel of the plurality of source color gamut pixels 110), the multiplexer 210 selects a set of coefficients from the coefficient set unit 212. After selecting the set of coefficients, the multiplexer 210 transmits data 230, such as the set of selected coefficients, to the polynomial algorithm unit 214. The polynomial algorithm unit 214 uses the set of selected coefficients to linearize the RGB values for the source color gamut pixels 110. For example, the polynomial algorithm unit 214 obtains, from the shaper LUT unit 202 and/or directly, data 232, such as the source color gamut pixels 110. Then, on a pixel-by-pixel basis, the polynomial algorithm unit 214 obtains the set of selected coefficients 230 from the multiplexer 210 and uses the set of coefficients for the multiplexer to linearize and/or transform the RGB values for the pixel of the plurality of source color gamut pixels 110. Afterwards, the polynomial algorithm unit 214 transmits data 234, such as the linearized RGB values for the pixel, to the interpolation logic unit 206.

In some implementations, the polynomial algorithm unit 214 uses a non-linear function (e.g., a piecewise curve and/or a polynomial equation) to transform the RGB values. As described above, the non-linear function includes coefficients for the sub-cube that the pixel is surrounded by, such as sub-cube 620. Thus, rather than inputting pixel values transformed by the shaper LUT unit 202 or directly form the source color gamut pixels 110, the polynomial algorithm unit 214 uses non-linear interpolation of a plurality of output pixel values (e.g., vertices of a sub-cube) to linearize the RGB values.

In some implementations, the polynomial algorithm unit 214 uses a different non-linear function (e.g., a piecewise curve and/or a polynomial equation) for one or more sub-cubes. For example, the polynomial algorithm unit 214 obtains the coefficient selection value identifying the sub-cube for the pixel. Depending on the coefficient selection value, the polynomial algorithm unit 214 selects a non-linear function for the sub-cube. In some examples, the selected non-linear function is different for each sub-cube. In other examples, the selected non-linear function is the same for one or more sub-cubes.

The interpolation logic unit 206 obtains the data 234, such as the transformed RGB values for the sub-cube, and uses an interpolation (e.g., tetrahedral or tri-linear interpolation or other non-linear interpolation techniques) to convert from the transformed RGB values to a corresponding pixel from the plurality of target color gamut pixels 130. The non-linear interpolation in unit 206 can be implemented using polynomial functions for each R, G and B or other more complex non-linear functions that involves R, G and B values simultaneously. In other words, the polynomial algorithm unit 214 and/or the interpolation logic unit 206 uses the output values (e.g., output pixel values) from the reduced 3-D LUT unit 204 to perform non-linear interpolation to minimize the errors during conversion from the plurality of source gamut pixels to the plurality of target color gamut pixels.

Figure 8:
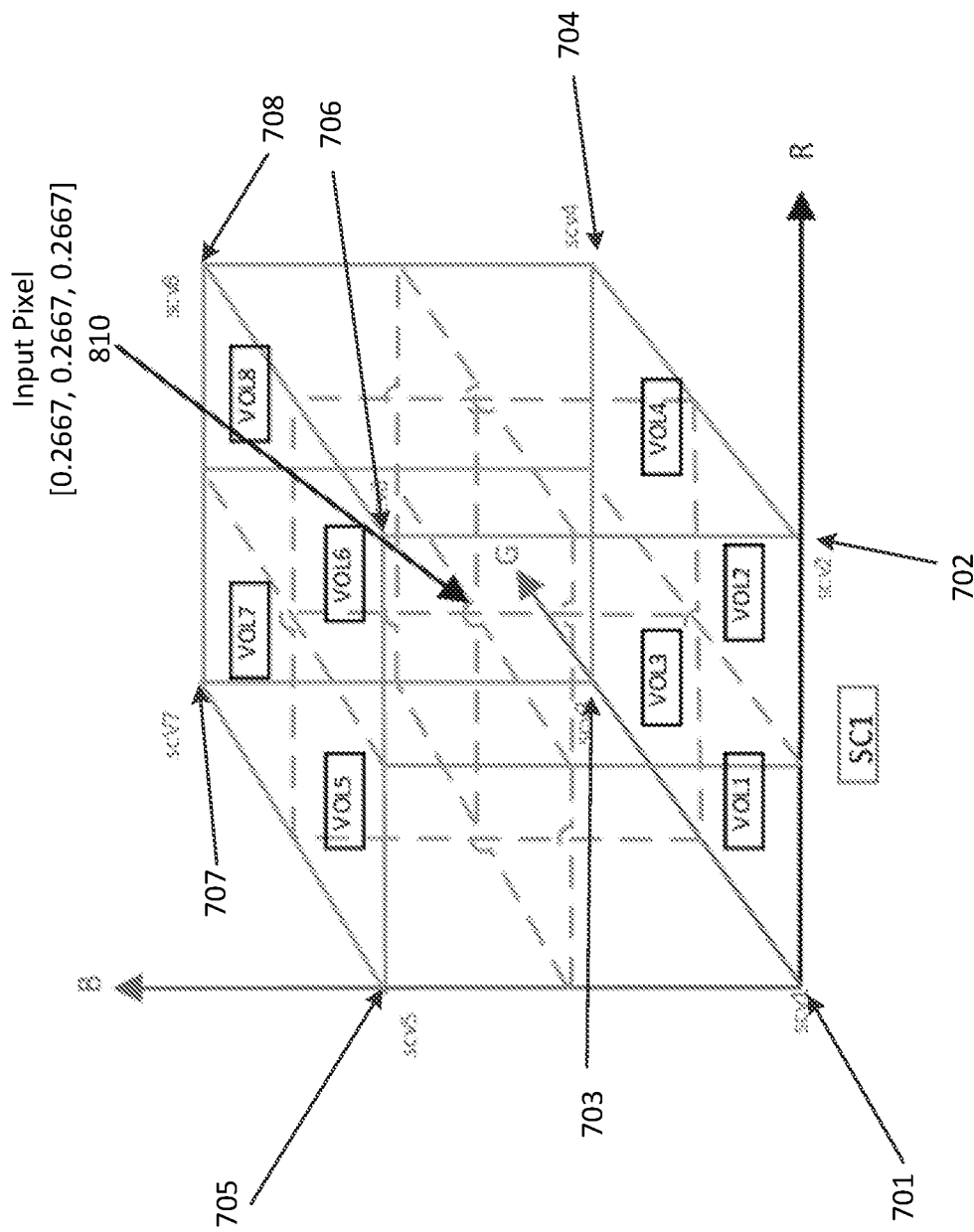
FIG. 8 is an exemplary pictorial representation of a non-linearized pixel within a sub-cube in accordance with one embodiment set forth in the disclosure.
Figure 9:
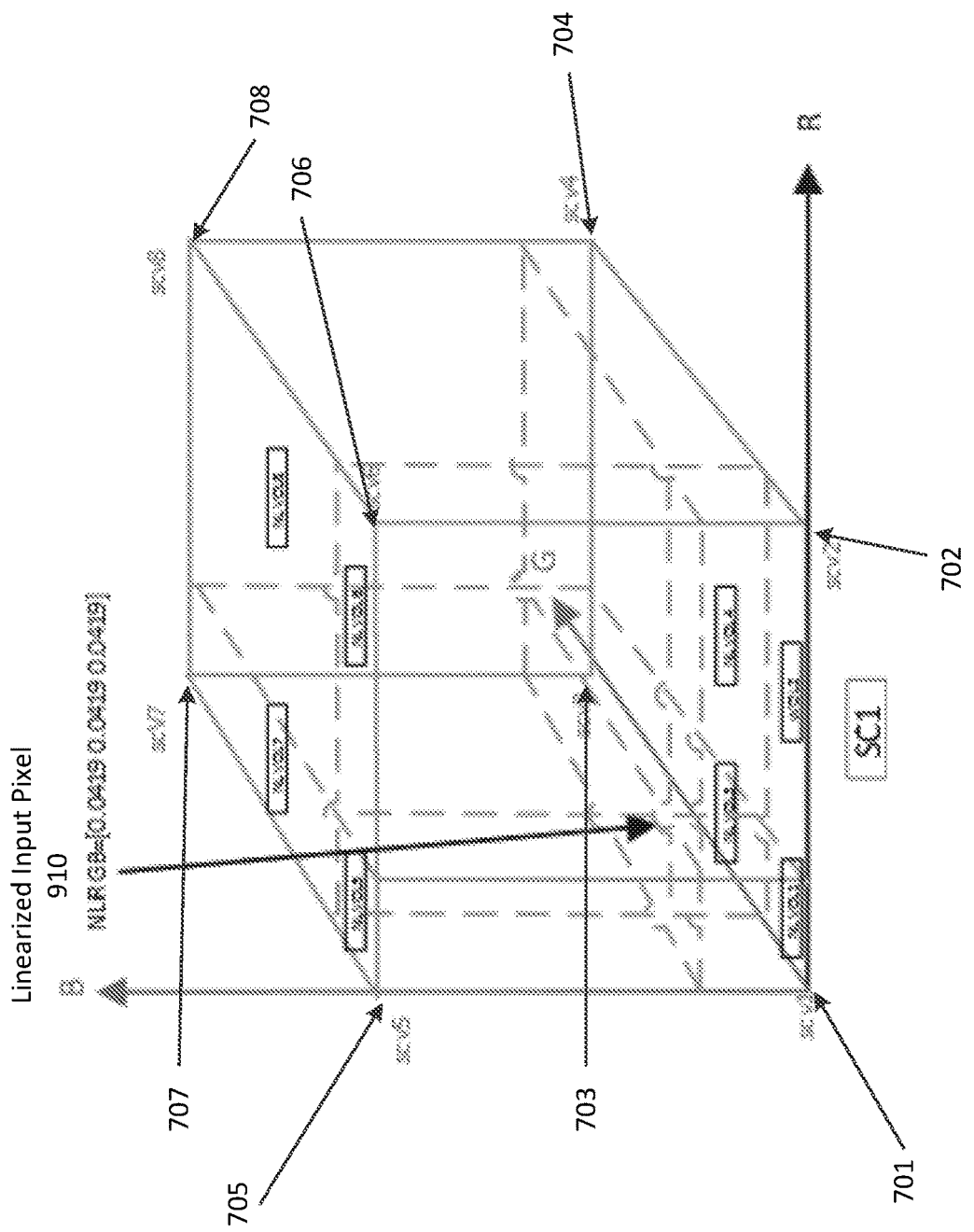
FIG. 9 is an exemplary pictorial representation of a linearized pixel within a sub-cube in accordance with one embodiment set forth in the disclosure.

FIGS. 8 and 9 illustrate an example of performing interpolation for a pixel from the source color gamut pixels 110 that is within a sub-cube, such as sub-cube 620. Referring to FIG. 8, the interpolation logic unit 206 obtains a pixel 810 from the plurality of source color gamut pixels 110 with a pixel value of [0.2667, 0.2667, 0.2667]. The pixel 810 is not linearized for the vertices within the sub-cube 620 (e.g., the polynomial coefficient selection unit 208, multiplexer 210, coefficient set unit 212, and/or the polynomial algorithm unit 214 are not used to linearize the pixel 810). Instead, only the shaper LUT unit 202 is used to linearize the pixel value for pixel 810. After performing the interpolation (e.g., tri-linear interpolation) for the pixel 810, the pixel value for the pixel 810 (e.g., the corresponding target color gamut pixel 130) is [0.1106, 0.1106, 0.1106]. However, if using the actual transform denoted above (e.g., $f(x)=x^{2.4}$), the correct value for the pixel is [0.0419, 0.0419, 0.0419]. Thus, the interpolation error for pixel 810 is [0.1106, 0.1106, 0.1106]−[0.0419, 0.0419, 0.0419]=[0.0687, 0.0687, 0.0687].

Referring to FIG. 9, the interpolation logic unit 206 linearizes pixel 810 using vertices within the sub-cube 620 (e.g., the polynomial coefficient selection unit 208, multiplexer 210, coefficient set unit 212, and/or the polynomial algorithm unit 214 are used to linearize the pixel 810) to create or generate pixel 910. After linearizing the pixel 810 using the vertices within the sub-cube 620, the pixel 910 has pixel values of [0.0419, 0.0419, 0.0419]. After performing the interpolation for pixel 910, the pixel value for the pixel 910 is [0.0419, 0.0419, 0.0419]. Thus, the interpolation error for pixel 910 is [0.0419, 0.0419, 0.0419]−[0.0419, 0.0419, 0.0419]=[0, 0, 0].

At step 306, the non-linear interpolation color conversion logic 120 provides, for display, the plurality of target color gamut pixels 130 on a target color gamut display. In some implementations, after converting the plurality of source color gamut pixels 110 to the plurality of target color gamut pixels 130, the non-linear interpolation color conversion logic 120 provides (e.g., sends and/or transmits) for display data, such as the target color gamut pixels 130, to the target color gamut display, such as the display device 140. After obtaining the target color gamut pixels 130, the display device 140 displays the target color gamut pixels 130.

In some variations, rather than using the non-linear interpolation color conversion logic described in FIGS. 1, 2, and 3 for color conversion and/or tone mapping, the non-linear interpolation color conversion logic is used for any method that uses interpolations and a reduced 3-D LUT unit. For example, methods for display calibrations, color processing that are non-spatial (flesh tone corrections and contrast enhancements), and/or printers can use the non-linear interpolation color conversion logic described in FIGS. 1, 2, and 3.

In some implementations, the polynomial algorithm unit 214 is optional. For example, the coefficient set unit 212 provides one or more functions (e.g., a Taylor Series transforms) and corresponding sets of coefficients to the multiplexer 210. Depending on the coefficient select value 226

(e.g., the control signal), the multiplexer 210 provides the selected function and/or set of coefficients directly to the interpolation logic unit 206.

In some implementations, a second polynomial algorithm unit and/or a second the multiplexer is connected between the reduced 3-D LUT unit 204 and the interpolation logic 206. For instance, in such implementations, rather than using a reduced 3-D LUT, the apparatus 200 uses a reduced N-dimension (e.g., 1, 2, 3, 4, and so on) LUT. The second polynomial algorithm unit and/or the second multiplexer obtain the coefficient select value from the polynomial coefficient selection unit 208. Based on the coefficient select value, the second multiplexer and/or the second polynomial algorithm unit selects a function to transform values from the reduced 3-D LUT unit 204. After transform the values, the second multiplexer and/or the second polynomial algorithm unit provides the values to the interpolation logic unit 206.

Figure 4:
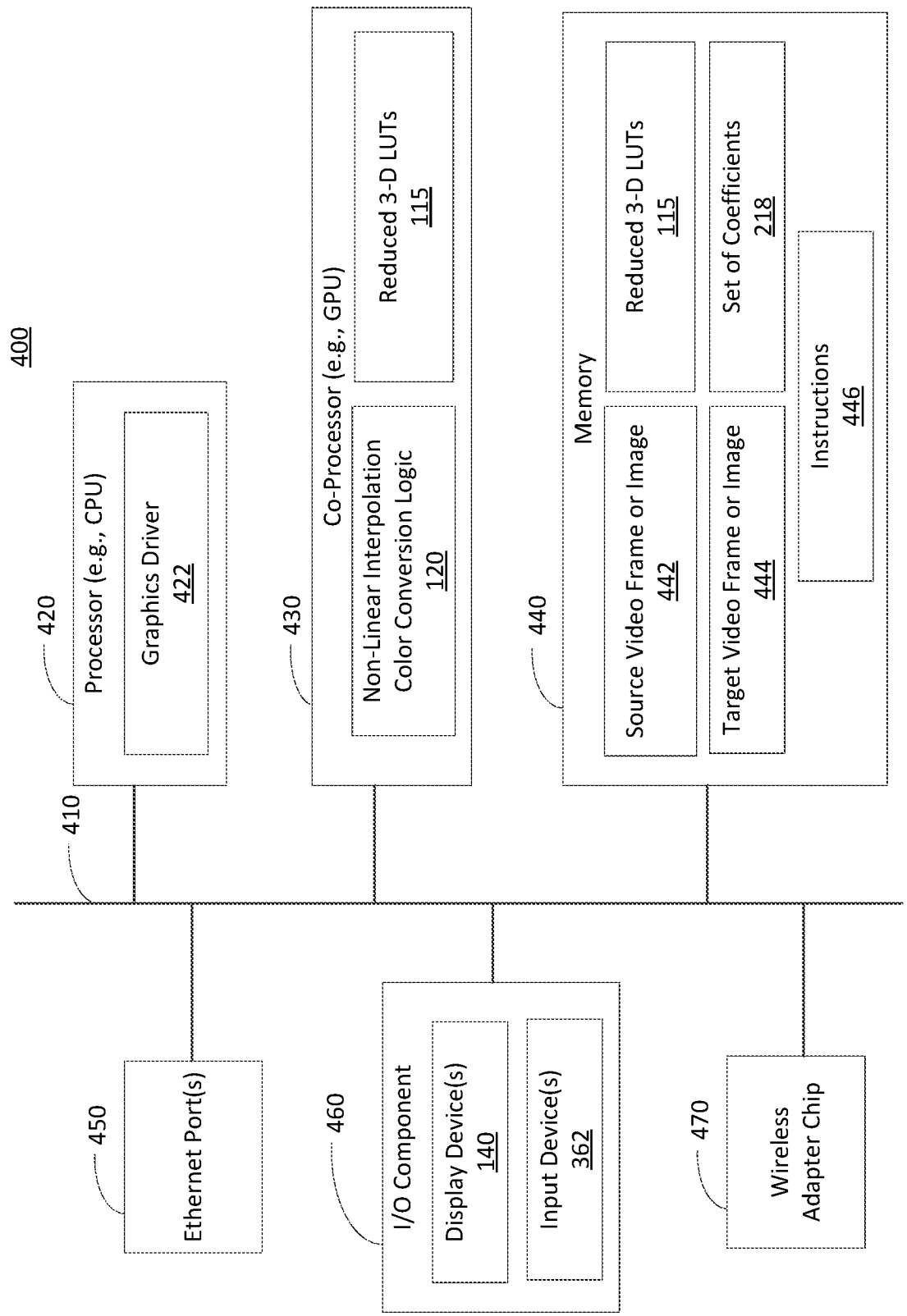
FIG. 4 is a schematic block diagram illustrating another example of an apparatus for mapping between different color gamuts in accordance with one embodiment set forth in the disclosure.

FIG. 4 is a schematic block diagram illustrating another example of an apparatus for mapping between color gamuts. As described above, the method 300 is implemented by the apparatus 100 described in FIG. 1. The apparatus 400, such as an image processing device, illustrates another example apparatus for implementing method 300 and/or other methods in this disclosure.

Apparatus 400 includes a bus 410 that, directly and/or indirectly, couples the following devices: a processor 420 (e.g., CPU), a co-processor 430 (e.g., GPU), a memory 440, one or more Ethernet port(s) 450, I/O component(s) 460, and wireless adapter chip(s) 470. Any number of additional components, different components, and/or combinations of components is also included in the apparatus 400. In some implementations, the I/O component(s) 460 include a presentation component configured to present information to a user such as, for example, a touch screen, display device 140, a speaker, a printing device, and/or the like, and/or an input component such as, for example, a microphone, a joystick, a satellite dish, a scanner, a printer, a wireless device, a keyboard, a pen, a voice input device, a touch input device, a touch-screen device, an interactive display device, a mouse, and/or the like.

The bus 410 represents one or more busses (such as, for example, an address bus, data bus, or combination thereof). Similarly, in some implementations, the apparatus 400 includes a number of processors 420 and co-processors 428, a number of memory components 432, a number of Ethernet port(s) 450, a number of I/O components 460, and/or a number of wireless adapter chip(s) 470. Additionally, any number of these components, or combinations thereof, is distributed and/or duplicated across a number of computing devices.

In one example, the processor 420 (e.g., CPU) executes a graphics driver 422 (stored in memory) to cause the processor to direct, operate, and/or control the non-linear interpolation color conversion logic 120. For example, as explained above, the non-linear interpolation color conversion logic 120 performs non-linear transforms from source to target color gamuts using a non-linear transformation of a plurality of pixel values (e.g., vertices) from the reduced 3-D LUTs. Further, as explained above, in some implementations, the graphics driver 422 calculates (e.g., generates and/or determines) a set of coefficients 218 for one or more sub-cubes of a cube representing a color gamut (e.g., a target color gamut).

In one example, the co-processor 430 (e.g., GPU) includes the non-linear interpolation color conversion logic 120 implemented as executing shader code or as discrete logic if desired. The co-processor 430 also includes the reduced 3-D LUTs 115. For example, prior to using the reduced 3-D LUTs 115, the co-processor 430 obtains the reduced 3-D LUTs 115 from memory. As explained above in FIGS. 1, 2, and 3, the non-linear interpolation color conversion logic 120 performs non-linear transforms from source to target color gamuts using the reduced 3-D LUTs 115.

In one example, the memory 440 stores source frame(s) or image(s) 442, target frame(s) or image(s) 444, the reduced 3-D LUTs 115, the set of coefficients 218, and/or computer-executable instructions 446 that when executed cause the processor 420 and co-processor 430 to implement aspects of embodiments of apparatus components discussed herein and/or to perform aspects of embodiments of methods and procedures discussed herein. The memory 440 may be RAM, ROM, or any suitable memory.

In some implementations, the memory 440 stores the reduced 3-D LUTs 115. For example, the apparatus 400 obtains the reduced 3-D LUTs 115 from a server via a network connection (e.g., via the Ethernet port(s) 450 and/or the wireless adapter chip 470). After obtaining the reduced 3-D LUTs 115, the apparatus 400 stores the reduced 3-D LUTs in memory 440. In some examples, a processor (e.g., a graphics driver 422 of a CPU 420) generates the reduced 3-D LUTs 115 and stores the reduced 3-D LUTs 115 in memory 440.

In some implementations, the source frame or image 442 includes the source color gamut pixels 110 as described in FIG. 1. The memory 440 receives, retrieves, and/or obtains the source frame or image 442 from the internet via the Ethernet port(s) 450 and/or the wireless adapter chip(s) 470. Additionally, and/or alternatively, the source frame or image 442 is a frame buffer that stores video or movie frames and/or images.

In some implementations, the target frame or image 444 includes the target color gamut pixels 130 as described in FIG. 1. The memory 440 stores and provides access to the target frame or image 444 from the non-linear interpolation color conversion logic 120. Additionally, and/or alternatively, the target frame or image 444 is stored in a frame buffer that stores video or movie frames and/or images.

The illustrative apparatus 400 shown in FIG. 4 is not intended to suggest any limitation as to the scope of use or functionality of embodiments of the present disclosure. Neither should the illustrative apparatus 400 be interpreted as having any dependency or requirement related to any single component or combination of components illustrated therein.

Figure 5:
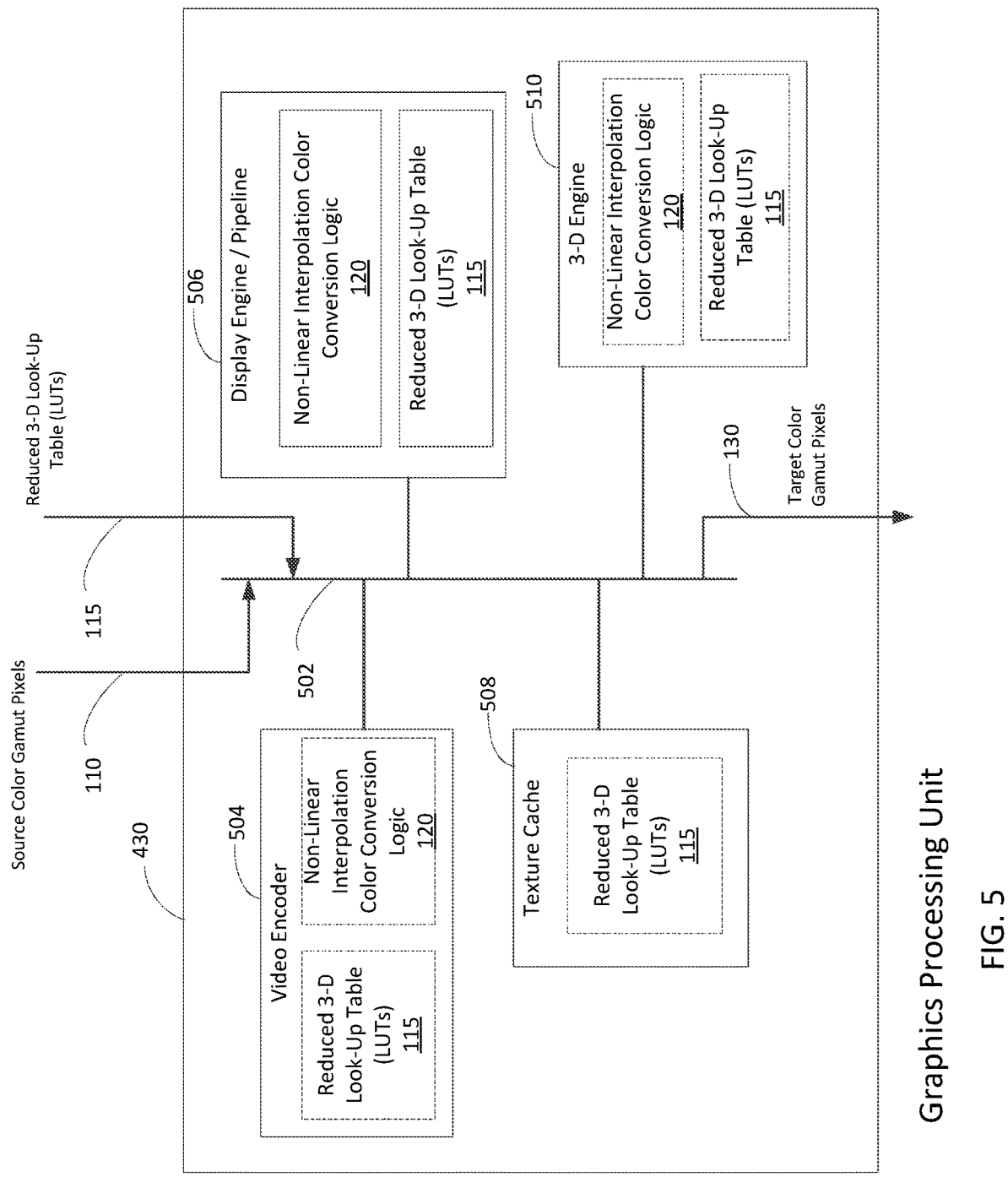
FIG. 5 is a schematic block diagram illustrating a graphics processing unit for mapping between different color gamuts in accordance with one embodiment set forth in the disclosure.

FIG. 5 illustrates an example graphics processing unit. Embodiments of the present disclosure, including FIG. 5, are described below by way of example only, with reference to the accompanying drawings. Further, the following description is merely exemplary in nature and is in no way intended to limit the disclosure, its application, or uses. Thus, while this disclosure includes particular examples and arrangements of the units, the scope of the present system should not be so limited since other modifications will become apparent to the skilled practitioner.

The graphics processing unit 430 includes a bus 502 that, directly and/or indirectly, couples the following: video encoder 504, display engine and/or pipeline 506, texture cache 508, and/or 3-D engine 510. Any number of additional components, different components, and/or combinations of components is also included in the graphics processing unit 430. The bus 502 represents one or more busses (such as, for example, an address bus, data bus, or combination thereof).

In some implementations, the display engine and/or pipeline 506 includes the non-linear interpolation color conversion logic 120 and the reduced 3-D LUTs 115. The display engine and/or pipeline 506 is an engine or pipeline that converts a frame, such as a source video frame 442 and/or a target video frame 444, into a displayable frame for a display device, such as display device 140. For example, the display engine 506 obtains source color gamut pixels 110 and/or reduced 3-D LUTs 115 (e.g., from memory 440) and performs tone mapping and/or color mapping for the graphics processing unit 430. While performing tone mapping and/or color mapping, the display engine and/or pipeline 506 uses the non-linear interpolation color conversion logic 120 to convert the source color gamut pixels 110 to target color gamut pixels 130 as described above.

In some implementations, the video encoder 504 includes the non-linear interpolation color conversion logic 120 and the reduced 3-D LUTs 115. The non-linear interpolation color conversion logic 120 converts the source color gamut pixels 110 to the target color gamut pixels 130 as described above. The video encoder 504 encodes and/or decodes images and/or frames of a video file, such as a video stream. For example, video streams are encoded to be able to be transmitted via the Internet (e.g., due to the large file size). The video encoder 504 obtains frames source color gamut pixels 110 from a server via the Internet (e.g., via the Ethernet port 540 and/or the wireless adapter chip 470). The video encoder 504 decodes the frames, such as the source color gamut pixels 110, and further converts the source color gamut pixels 110 to the target color gamut pixels 130.

In some implementations, the texture cache 508 stores the reduced 3-D LUTs 115. For example, the graphics processing unit 430 obtains the reduced 3-D LUTs 115 from memory 440 and stores the reduced 3-D LUTs 115 in the texture cache 508. The 3-D engine 510 includes the non-linear interpolation color conversion logic 120 and uses the reduced 3-D LUTs 115 to convert the source color gamut pixels 110 to the target color gamut pixels 130 as described above. The 3-D engine generates frames and/or images for an apparatus, such as apparatus 400. Additionally, and/or alternatively, the 3-D engine 510 can optionally include the reduced 3-D LUTs 115.

Among other technical benefits, some implementations allow HDR or WCG videos and/or images to be displayed on SDR display devices. For example, to display a HDR video and/or image, an apparatus needs to transform the movie and/or image from the HDR color gamut to SDR color gamuts. By using non-linear interpolation color conversion, colors are more accurately mapped and the quality of the image appears more natural (e.g., the rendering intent of the HDR picture is better preserved).

Furthermore, some implementations allow smaller reduced LUTs (e.g., 3-D or N-D) to accurately interpolate between pixel values. As mentioned previously, LUTs require significant memory space. Increasing the reduced LUT size increases the design cost exponentially. Thus, by using smaller reduced LUTs to accurate interpolate between pixel values, design costs, processing speed of the apparatus increases, and memory space are drastically lowered.

The above detailed description of the present disclosure and the examples described therein have been presented for the purposes of illustration and description only and not by limitation. It is therefore contemplated that the present disclosure covers any and all modifications, variations or equivalents that fall within the spirit and scope of the basic underlying principles disclosed above and claimed herein.

What is claimed is:

1. A method of mapping between color gamuts comprising:
    obtaining, by an apparatus, a source image having a plurality of source color gamut pixels in a source color gamut;
    converting, by the apparatus, the plurality of source color gamut pixels to a plurality of corresponding narrower target color gamut pixels using non-linear interpolation of a plurality of output pixel values from a reduced 3 dimensional (3-D) look-up table (LUT) corresponding to a target color gamut, wherein the reduced 3-D LUT comprises a plurality of displayable target color values representing vertices of a plurality of sub-cubes that represent less than all entries within the target color gamut; and
    providing, for display, by the apparatus, the plurality of corresponding target color gamut pixels on a target color gamut display.

2. The method of claim 1, wherein the converting the plurality of source color gamut pixels to the plurality of corresponding target color gamut pixels comprises performing a first non-linear interpolation for a plurality of first pixel values from the reduced 3-D LUT that is different from a second non-linear interpolation for a plurality of second pixel values from the reduced 3-D LUT.

3. The method of claim 2, wherein the plurality of first pixel values from the reduced 3-D LUT correspond to vertices of a sub-cube within the target color gamut and wherein the converting the plurality of source color gamut pixels to the plurality of corresponding target color gamut pixels further comprises:
    determining, based on the plurality of first pixel values from the reduced 3-D LUT, a set of polynomial coefficients for the sub-cube, and
    wherein the performing the first non-linear interpolation is based on the set of polynomial coefficients.

4. The method of claim 3, wherein the performing the first non-linear interpolation based on the set of polynomial coefficients is prior to performing a tetrahedral interpolation calculation or a tri-linear interpolation calculation.

5. The method of claim 3, wherein a graphics driver calculates the set of polynomial coefficients by performing a Taylor Series transform based on the vertices of the sub-cube within the target color gamut.

6. The method of claim 2, wherein the first non-linear interpolation is a piecewise linear curve or a polynomial equation.

7. The method of claim 1, wherein the converting the plurality of source color gamut pixels to the plurality of corresponding target color gamut pixels is performed by a 3-D engine.

8. The method of claim 1, wherein the converting the plurality of source color gamut pixels to the plurality of corresponding target color gamut pixels is performed by a video encoder, and
    wherein the obtaining the plurality of source color gamut pixels comprises obtaining the plurality of source color gamut pixels from a server via an internet connection.

9. The method of claim 1, the converting the plurality of source color gamut pixels to the plurality of corresponding target color gamut pixels is performed by a display engine, and
    wherein the display engine performs tone mapping operations for the target color gamut display.

10. An apparatus comprising:
    non-linear interpolation color conversion logic configured to:

obtain a source image having a plurality of source color gamut pixels in a source color gamut;

convert the plurality of source color gamut pixels to a plurality of corresponding narrower target color gamut pixels using non-linear interpolation of a plurality of output pixel values from a reduced 3-D LUT corresponding to a target color gamut, the 3-D LUT comprising a plurality of displayable target color values representing vertices of a plurality of sub-cubes that represent less than all entries within the target color gamut; and provide for display the plurality of corresponding target color gamut pixels on a target color gamut display.

11. The apparatus of claim 10, wherein the non-linear interpolation color conversion logic converts the plurality of source color gamut pixels to the plurality of corresponding target color gamut pixels by performing a first non-linear interpolation for a plurality of first pixel values from the reduced 3-D LUT that is different from a second non-linear interpolation for a plurality of second pixel values from the reduced 3-D LUT.

12. The apparatus of claim 11, wherein the plurality of first pixel values from the reduced 3-D LUT correspond to vertices of a sub-cube within the target color gamut and wherein non-linear interpolation color conversion logic converts the plurality of source color gamut pixels to the plurality of corresponding target color gamut pixels by:

determining, based on the plurality of first pixel values from the reduced 3-D LUT, a set of polynomial coefficients for the sub-cube, and wherein the performing the first non-linear interpolation is based on the set of polynomial coefficients.

13. The apparatus of claim 12, wherein the non-linear interpolation color conversion logic performs the first non-linear interpolation prior to performing a tetrahedral interpolation calculation or a tri-linear interpolation calculation.

14. The apparatus of claim 12, further comprising:

a processor comprising a graphics driver, wherein the graphics driver is configured to calculate the set of polynomial coefficients by performing a Taylor Series transform based on the vertices of the sub-cube within the target color gamut.

15. The apparatus of claim 12, wherein the plurality of second pixel values from the reduced 3-D LUT correspond to vertices of a second sub-cube and wherein non-linear interpolation color conversion logic converts the plurality of source color gamut pixels to the plurality of corresponding target color gamut pixels by:

determining, based on the plurality of second pixel values from the reduced 3-D LUT, a second set of polynomial coefficients for the second sub-cube, wherein the second set of polynomial coefficients is different from the set of polynomial coefficients; and performing the second non-linear interpolation based on the second set of polynomial coefficients.

16. The apparatus of claim 11, wherein the first non-linear interpolation is a piecewise linear curve or a polynomial equation.

17. The apparatus of claim 10, further comprising:

a video encoder, wherein the video encoder comprises the non-linear interpolation color conversion logic, and wherein the video encoder is configured to:

obtain the plurality of source color gamut pixels from a server via an internet connection.

18. The apparatus of claim 10, further comprising:

a display engine, wherein the display engine comprises the non-linear interpolation color conversion logic, and wherein the display engine performs tone mapping operations for the target color gamut display.

19. The apparatus of claim 10, further comprising:

a 3-D engine, wherein the 3-D engine comprises the non-linear interpolation color conversion logic; and a texture cache, wherein the texture cache stores the reduced 3-D LUT corresponding to the target color gamut.

20. An integrated circuit comprising:

a first processor, wherein the first processor comprises:

non-linear interpolation color conversion logic configured to:

obtain a source image having a plurality of source color gamut pixels in a source color gamut;

obtain a reduced 3-D LUT corresponding to a target color gamut, the reduced 3-D LUT comprises a plurality of displayable target color values representing vertices of a plurality of sub-cubes;

select, on a pixel-by-pixel basis, a plurality of pixel values from the plurality of displayable target color values, a plurality of pixel values representing vertices of a sub-cube of the plurality of sub-cubes within the target color gamut;

determine, based on a non-linear interpolation of the vertices of the sub-cube, a set of polynomial coefficients for the sub-cube representing a Taylor Series transform;

convert, based on the set of polynomial coefficients for the sub-cube, the plurality of source color gamut pixels to a plurality of corresponding target color gamut pixels using the non-linear interpolation of the vertices of the sub-cube; and provide, for display, the plurality of corresponding target color gamut pixels on a target color gamut display.

* * * * *